Figure 1:
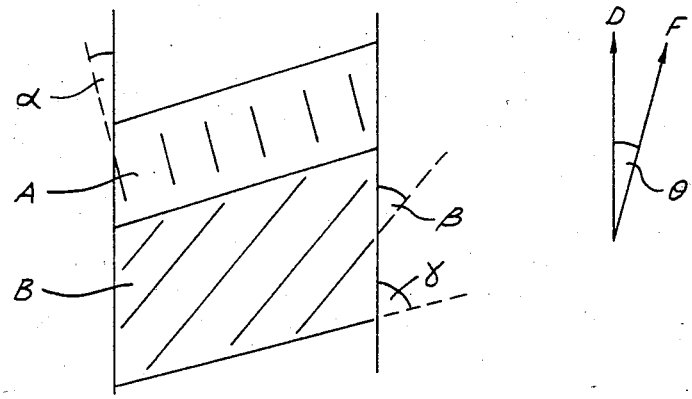

United States Patent [19]

Sansom

[11] Patent Number: 4,593,336
[45] Date of Patent: Jun. 3, 1986

[54] MAGNETIC RECORDING

[75] Inventor: David J. Sansom, Chertsey, England

[73] Assignee: Emi Limited, Hayes, England

[21] Appl. No.: 495,527

[22] Filed: May 17, 1983

[30] Foreign Application Priority Data

May 18, 1982 [GB] United Kingdom ............... 8214500

[51] Int. Cl.$^4$ ............................................. G11B 23/00
[52] U.S. Cl. .................................... 360/131; 360/113
[58] Field of Search .............. 360/113, 131, 132, 133, 360/134

[56] References Cited

U.S. PATENT DOCUMENTS 3,784,796  1/1974  Namikawa ......................... 360/131

FOREIGN PATENT DOCUMENTS 1162107   8/1969  United Kingdom .
1331604   9/1973  United Kingdom .
1486888   9/1977  United Kingdom .
1519142   7/1978  United Kingdom .
1524187   9/1978  United Kingdom .
1529937  10/1978  United Kingdom .

OTHER PUBLICATIONS

IEEE Transactions on Magnetics, vol. MAG-12, No. 6, Nov. 1976, Titled: "Dual Stripe Magnetoregistive Read Heads for Speed Insensitive Tape Readers".

Primary Examiner—John H. Wolff
Attorney, Agent, or Firm—Fleit, Jacobson, Cohn & Price

[57] ABSTRACT

A permanently structured magnetic recording tape includes a pattern of first and second regions of acicular iron oxide particles, the first 'A' regions being orientated at 22.5° (clockwise) to the tapes axis and the second 'B' regions being orientated at 67.5° (clockwise) to the tape axis. A permanent magnet applies a developing field at 45° (anti-clockwise) to the tape axis such that, at the transition in orientation direction, the normal components of remanence in 'A' and 'B' regions are in opposite directions, thereby increasing pole strength at the transitions compared with longitudinal development, and enhancing the output signal at the magnetoresistive read-out transducer.

A second magnetoresistive transducer senses fluctuations in magnetic polarity at the tape edge to verify whether the medium is genuine.

9 Claims, 10 Drawing Figures

FIG. 7
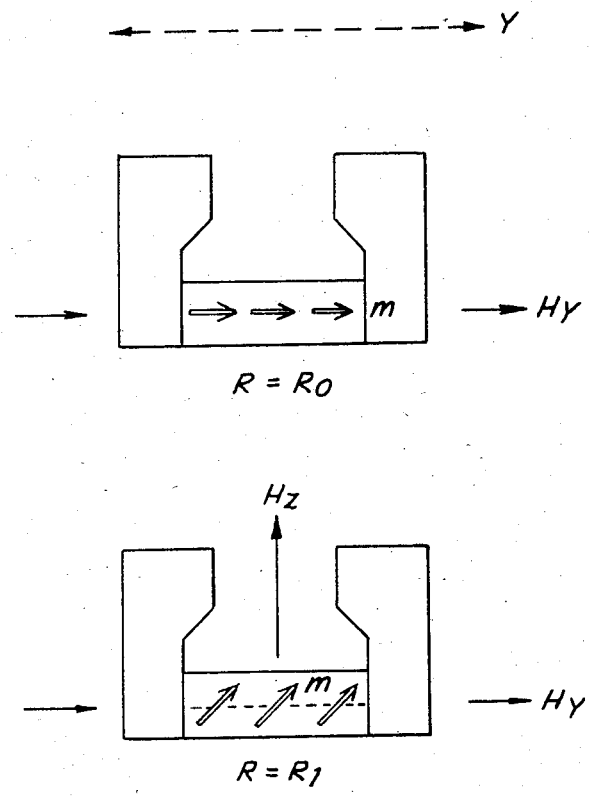
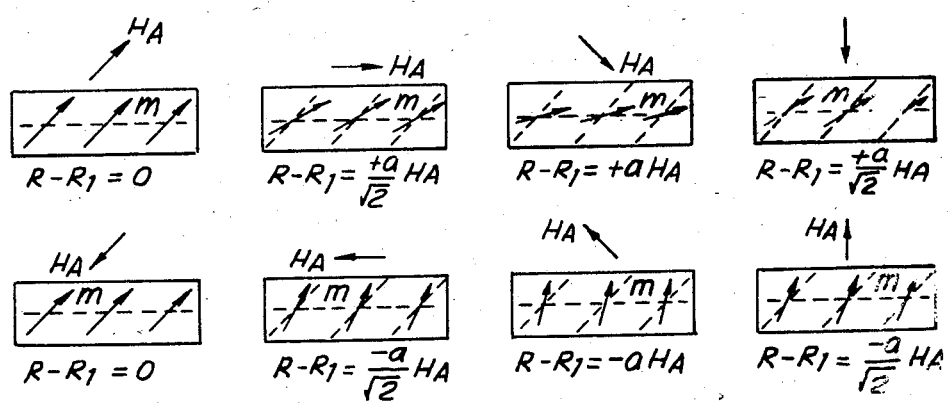

MAGNETIC RECORDING

This invention relates to magnetic recording, including the permanent magnetic recording of information and means for replay and verification.

The use of permanent magnetic recordings in security cards and documents, permitting identification by machine is well known. British Patent Specification No. 1331604 discloses a method of making a permanently recorded structure or magnetic "watermark" in a tape layer comprising anisotropic magnetic particles embedded in a suitable binder such as a resinous lacquer. Selected regions of the layer contain magnetic particles orientated in a selected first direction and the remaining regions commonly contain magnetic particles orientated substantially at right angles to that first direction. The positions of the transitions between the regions of different orientations are suitably coded to represent permanently recorded information, and such a tape may be readily assembled to a security card or document.

It is desirable in practice to have a reading means which will provide a sufficiently high output signal for error-free data recovery, and preferable to also provide a means of verification which is capable of distinguishing a genuine structured layer from a counterfeit permanent recording medium.

The permanently recorded information may be read by first magnetizing the layer to saturation with a strong unidirectional field known as a developing field, removing the developing field and detecting the magnetic flux changes in the vicinity of the transitions in orientation direction by scanning the tape over field sensing means such as a magnetic "replay" transducer. The replay transducer may be of the conventional inductive design, or may alternatively be a magneto-resistive (MR) tranducer as described, for example, in British Patent Specification No. 1162107. Particle orientation directions which lie along and at right angles to the direction of tape motion have commonly been used, associated with a developing field along the axis of the tape, i.e. in the direction of tape motion. Means of verification have been proposed which involve the application of a second developing field. British Patent Specification No. 1486888 discloses the use of a second developing field at 90° to the first developing field, while British Patent Specification No. 1519142 discloses the use of a second developing field in the same direction as the first developing field, but at a different level of magnetic intensity.

The methods of development, reading, and verification disclosed in the above specifications are generally adequate for most purposes, but it is desirable to increase the replayed signal level and to increase the security of verification methods.

It is an object of this invention to provide improved methods of reading and verifying permanent magnetic recordings, suitable for use with security documents, cards or devices.

According to one aspect of the invention there is provided a method of reading information which is permanently recorded on a magnetic layer containing magnetically anisotropic particles, selected first regions of said layer containing particles whose easy axes are predominantly orientated in a selected first orientation direction, said first regions being spaced from one another by second regions containing particles whose easy axes are predominantly orientated in a selected second orientation direction, said permanently recorded information being represented by the positions of transitions which define the boundaries between adjacent first and second regions, said transitions lying substantially parallel to one another, said information being prepared for read-out by the application and subsequent removal of a saturating uni-directional developing field, characterised in that neither of said first and second orientation directions is parallel to said transitions, and said developing field is applied in a direction lying between said first and second orientation directions and not at right angles to the transitions such that the components of remanant magnetisation at right angles to the transitions in adjacent first and second regions are in opposite directions, field sensing means being used to detect the positions of said transitions.

According to another aspect of the invention there is provided a method of verifying a recording medium purporting to represent a magnetically structured medium, said medium being prepared for verification by the application and subsequent removal of uni-directional developing field to form a developed track in said medium, characterised in that field sensing means are used to detect the fluctuations in remanent magnetic pole strength along an edge of said track, thereby establishing whether said medium is genuine.

Figure 2:
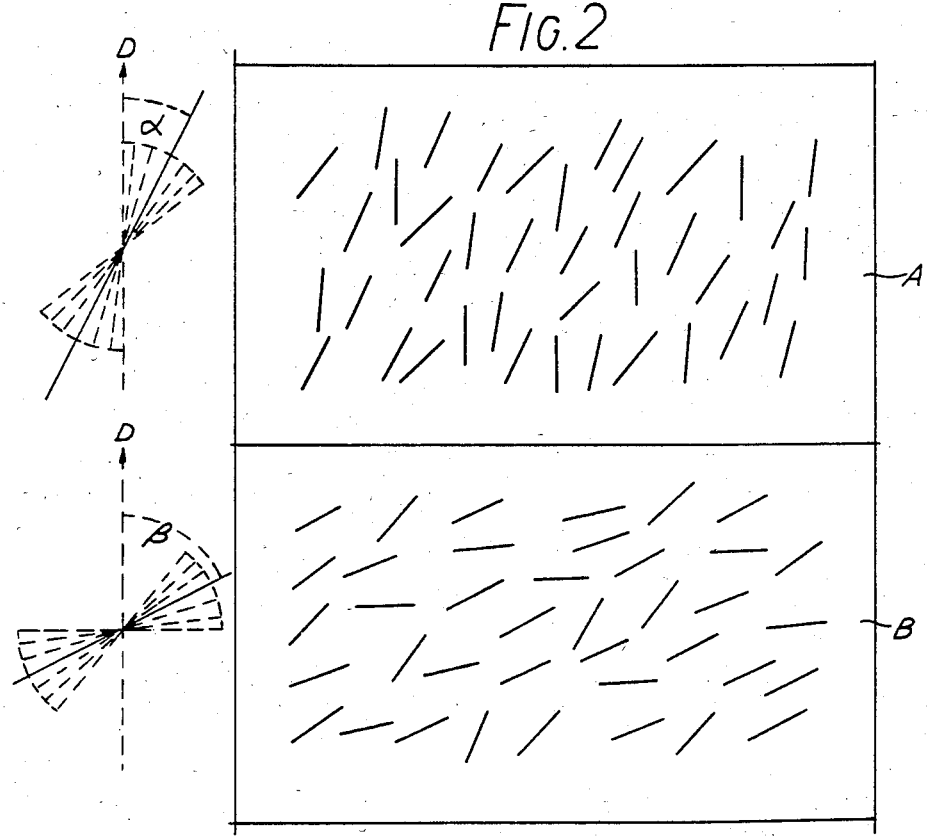
Figure 3:
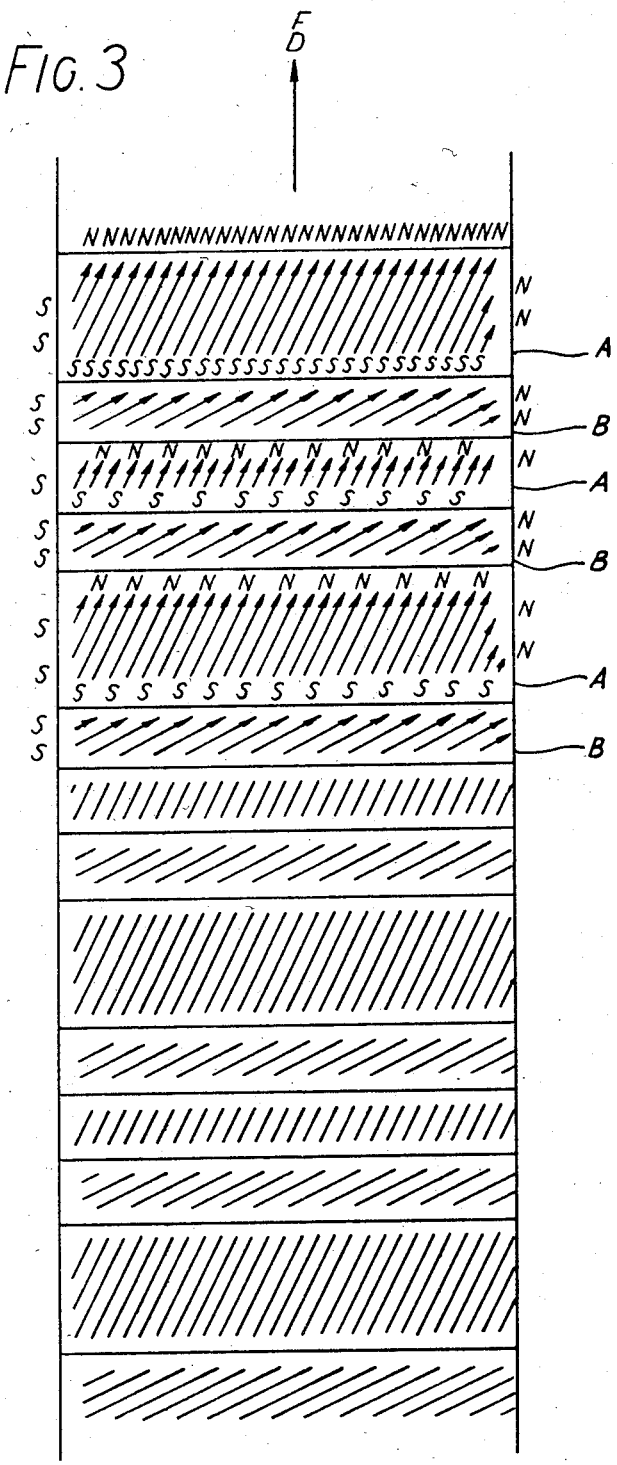
Figure 4:
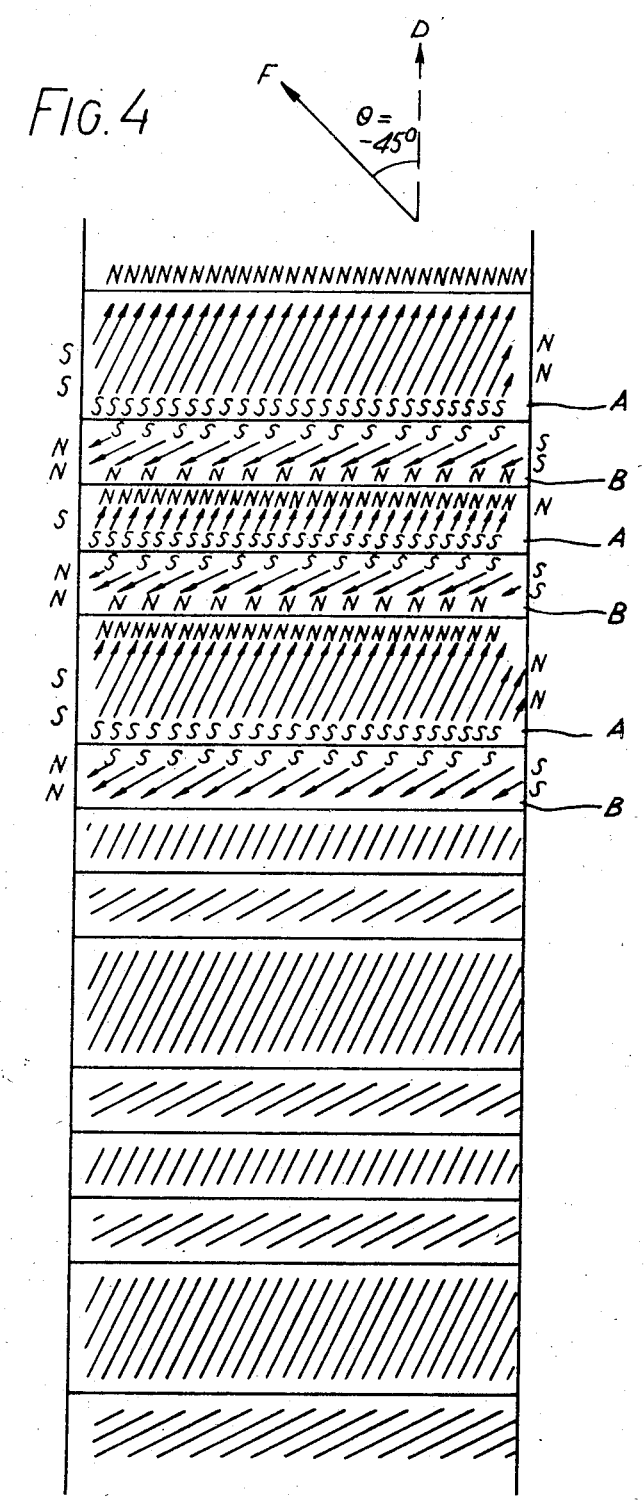
Figure 5:
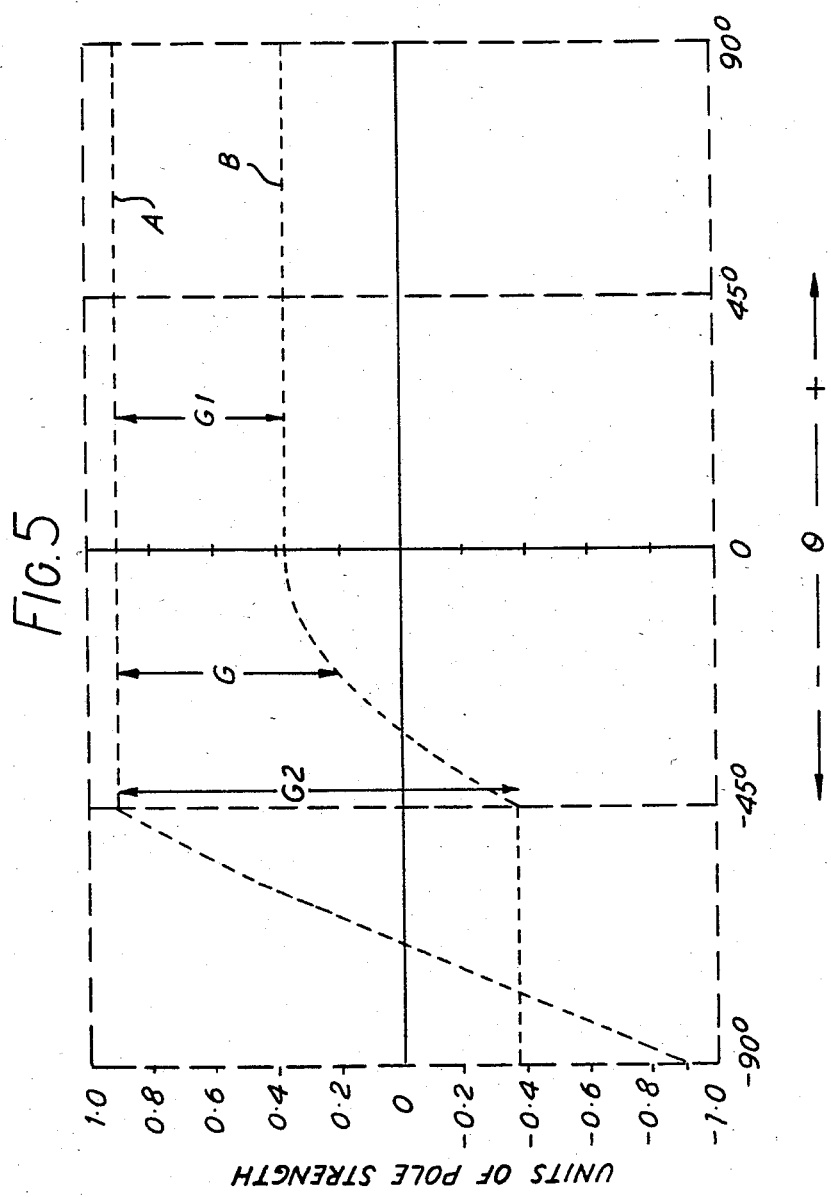
Figure 6:
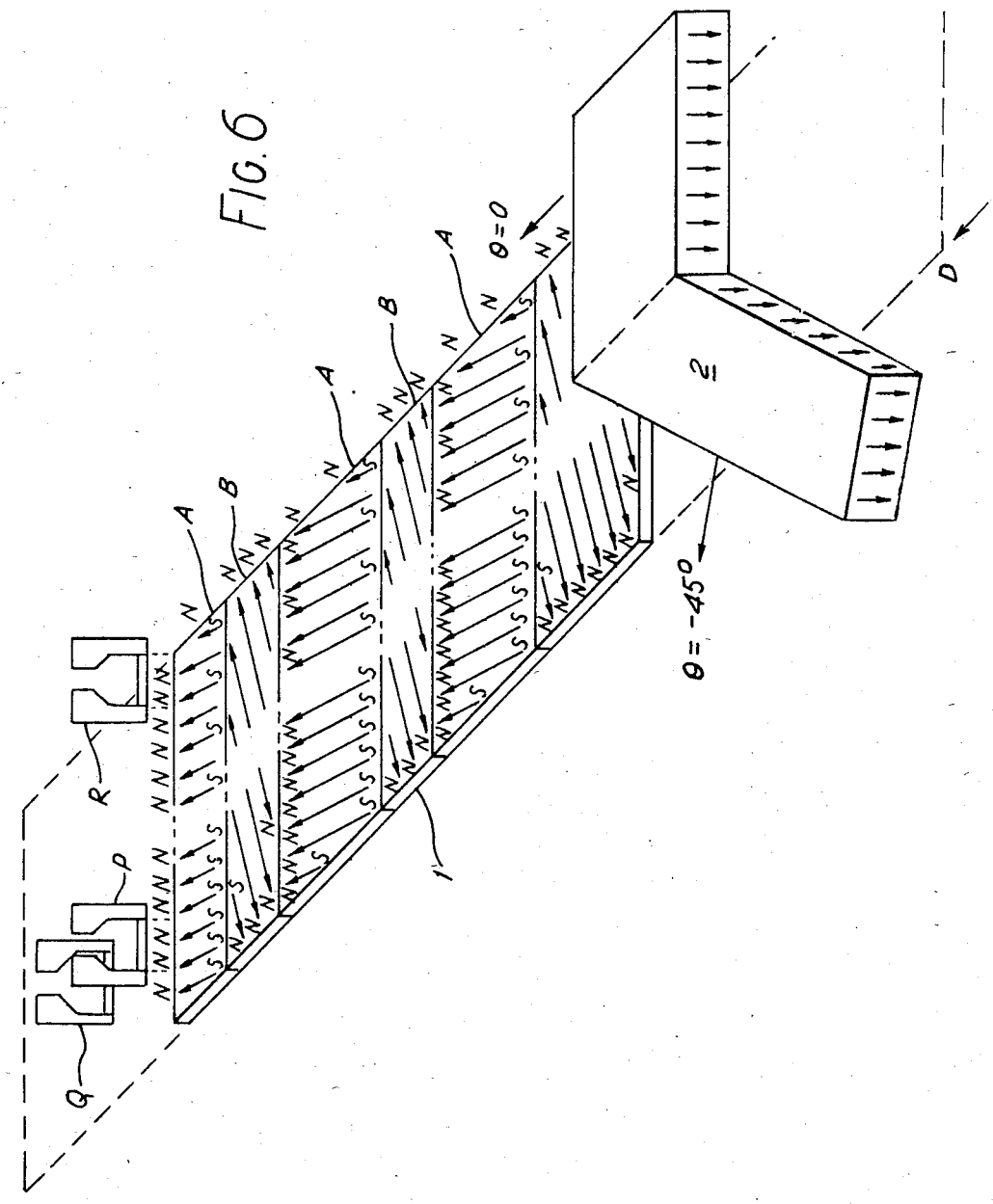
Figure 8A:
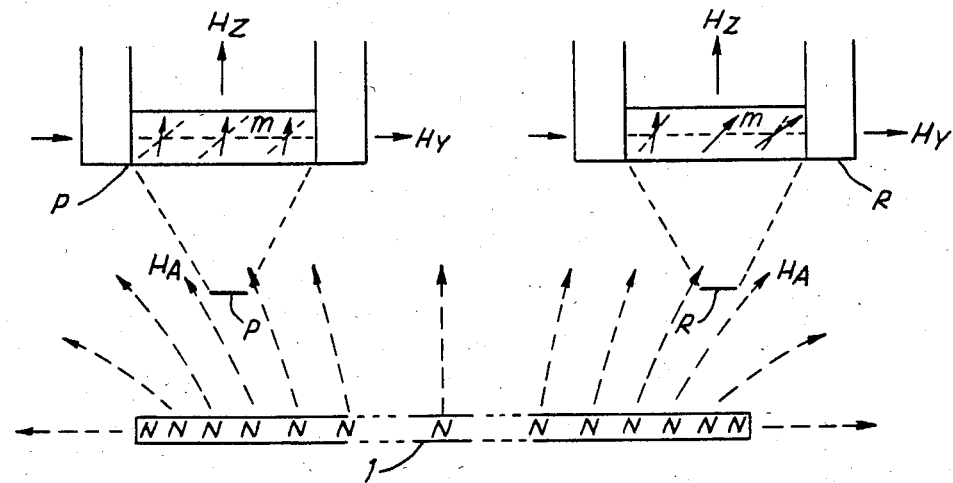
Figure 8B:
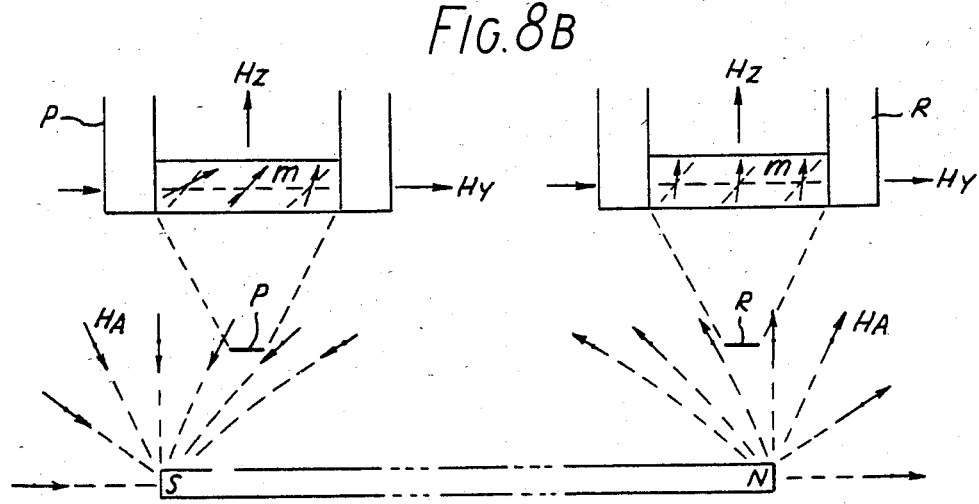
Figure 9:
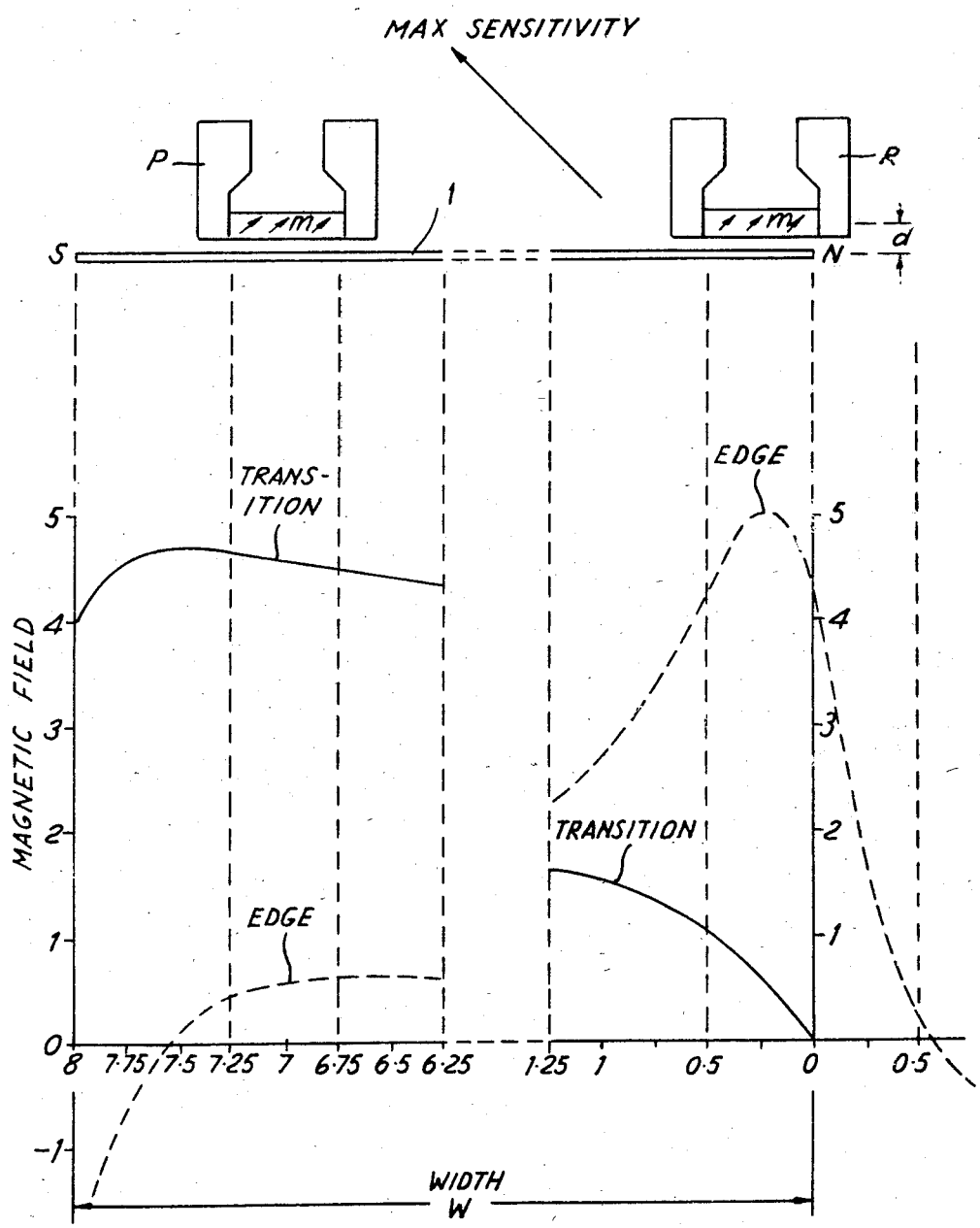

An embodiment of the invention will now be described, by way of example and with reference to the accompanying drawings, in which:

FIG. 1 illustrates a magnetic recording medium, carrying first and second regions, region A and region B, in the genaral case, FIG. 2 illustrates a magnetic recording medium with first and second regions and the particle orientation therein, FIG. 3 illustrates magnetisation directions in a structured magnetic recording medium after an axial ($\theta=0°$) development field has been applied and removed, FIG. 4 illustrates magnetisation directions in the magnetic recording medium of FIG. 3 after a $-45°$ development field has been applied and removed, FIG. 5 illustrates the variation of the axial components of region A and region B magnetisations in dependence on angle of development field, FIG. 6 illustrates positioning of MR read heads for high sensitivity to remanence magnetic fields, FIG. 7 illustrates obtaining directional sensitivity in a MR element, FIG. 8A shows a remanence magnetic field above a transition between regions, and its influence on two MR elements, P and R, FIG. 8B shows a remanence magnetic field midway between transitions, and its influence on MR elements, P and R, FIG. 9 illustrates the response of MR elements P and R to transition remanence magnetic fields and edge pole remanence magnetic fields.

A permanent magnetic recording may be manufactured by coating a longitudinal moving tape or support of elongate strip like form with a dispersion of magnetically anisotropic particulate material, typically acicular $\gamma$-ferric oxide, in a settable binder. A magnetic field is applied to orientate a large percentage of the particles at an angle $\beta$ to the direction of motion or axis, D of the tape. In this way the direction of all particles is substantially the same. Coded information is then applied in a pulsed manner to a magnetic head, which applies a second field to the tape in response to the information, which second field orientates particles in regions A to lie at an angle α to the axis D, the axis lying parallel to a long edge of the tape or support. The regions unaffected by the second field retain their previous orientation and become regions B. The transition between regions A and B are commonly at 90° to axis D but may in fact make an angle γ thereto. The tape is then dried to set the binder and the particles of regions A and B then become fixed in their respective orientations, hence creating a permanent record or pattern. A permanent magnetic record of this type is illustrated in FIG. 1. A development field F may be applied to the tape at an angle θ to the axis D as will be explained hereinafter.

Some examples of prior art "watermarked" layers, in relation to our generalised FIG. 1 are shown in British Patent Specification No. 1524187 in which FIG. 1(a) shows α=0°, β=90°, γ=90°, a commonly used "90° watermark", FIG. 1(b) shows α=+45°, β=-45°, γ=45°, a commonly used "45° watermark", FIG. 1(c) also α=-β, γ=90°-α.

A further example is shown in British Patent Specification No. 1529937, FIG. 2e, in which α=0°, β=45° and γ=90°.

It has been common practice to apply a developing field in the direction of tape motion, i.e. along the axis with θ=0°, although developing fields at right angles to the axis, θ=90°, have been disclosed in British Patent Specification Nos. 1486888 and 1529937.

An example of a "watermarked" layer suitable for use with the present invention is shown in FIG. 2. The short lines in region A and B represent, in much magnified form, acicular particles of ferric oxide, whose easy axes of magnetisation lie along their lengths. Mean orientation angles are α=+22.5° for A regions and β=+67.5° for B regions, the + sign representing clockwise rotation in relation to the axis D. It is well known to those skilled in the art that due to effects such as magnetic interaction and Brownian motion, the alignment of magnetic particles in an orientated tape is not in practice perfect, and large spreads occur about the mean orientation direction. The remanant magnetisation, indicated by arrows, and magnetic poles at transitions and tape edges, are shown in FIG. 3 for a watermark tape contructed as defined above, following the conventional application of a developing field F along the direction of the tape axis D, i.e. θ=0°. While, at the transitions betwean 'A' and 'B' regions, there is a change in axial components of remanence, there is no actual reversal of remanent magnetisation as a transition is crossed. Furthermore, there is no reversal of polarity along the tape edges, the right hand edge having entirely N polarity and the left hand edge having entirely S polarity, although the strength of the A region edge polarities differs from the strength of B region edge polarities.

FIG. 4 shows the effect of applying a strong developing field F to a similarly watermarked medium at an angle θ=-45° to the axis D. It is seen that the remanent magnetisations in the 'B' regions have been reversed, compared with FIG. 3, while the remanence of the 'A' regions remains unchanged. The polarities at the edges of the B regions have been similarly reversed compared with FIG. 3.

The reversal of remanence of the B regions gives rise to an increased level of signals in a replay tranducer, as follows.

FIG. 5 shows theoretically derived curves for the longitudinal component of remanent magnetisation, shown in normalised units of pole strength, unity representing true saturation, for various directions θ of developing field, assuming orientation angles with spreads of ±22.5°, i.e. α=+22.5°±22.5° and β=67.5°±22.5°, as shown in FIG. 2. The vertical distance G between the curves of FIG. 5 represents the pole strength at a transition. The transition pole strength for all positive values of θ is constant at G1, and equal to the value for an axial developing field, i.e. θ=0° as shown in FIG. 3.

A peak value of transition pole strength, G2, occurs when θ=-45°, as shown in FIG. 4. Values of G2 and G1 are 1.36 and 0.56, normalised to unity for normal magnetic saturation, indicating that an improvement in replay signals by a factor of 2.4 occurs in changing θ from 0° to -45°. This ratio has been confirmed experimentally, using tape manufactured as follows.

During manufacture, while the coating is still wet, a field is applied at approximately +67.5° to the direction of motion, followed by a modulating longitudinal field from a coding head. This results in average orientation direction closely as considered above for regions A and B.

The value of G2 for such a tape when developed at θ=-45° is 36% higher than for an idealised perfectly aligned axially developed transition. Effectively, the sensitivity to the transitions in a practical medium can be increased by providing a permanent magnetic medium and developing field at appropriate angles which will more than compensate for any loss of sensitivity due to incomplete orientation in regions A and B during manufacture of the medium.

Sensitivity to the transitions between regions can be further improved by careful arrangement of the read heads responsive to the remanence magnetic fields. Magneto-resistive (MR) elements can be used to read a magnetic recording and use may be made of their directional sensitivity to provide high sensitivity read-out and verification of the medium. FIG. 6 illustrates the advantageous location of MR elements P, Q and R above a permanent "watermarked" magnetic recording 1. The recording has been passed through a development field resulting from a magnet 2, which creates a θ=-45° development field for the left hand half of the recording and an axial, θ=0° development field for the right hand half of the recording.

Each MR element is manufactured to have an easy axis of magnetisation along an axis Y, FIG. 7. A horizontal bias field Hy applied to the element along the easy axis will produce a resistance value R equal to $R_o$. When a vertical bias field Hz is applied to cause the magnetisation vector m of the element to lie at an angle of 45° counter-clockwise to the axis Y, the resistance of the element R is equal to $R_1$. If the MR element is used with such bias fields acting, then the direction of minimum sensitivity to an applied field $H_A$ will be along the vector m, i.e. at angles of 45° and 225° counter-clockwise to the axis Y. The changes in resistance of the element with respect to the direction of the applied field are so illustrated in the lower part of FIG. 7 and show that the MR element is most sensitive to applied fields at an angle of 135° or 315° counter-clockwise to the easy axis Y, that is to say perpendicular to the direction of vector m, when $R = R_1 \pm a\ H_A$. The value of "a" in the figure is an arbitary constant and the value of the applied field $H_A$ is significantly less than the bias fields Hy and Hz.

The MR elements P and R in FIG. 6 are biased as defined above and it is apparent that MR element P will produce improved signal response by arranging it to lie such that the remanence magnetic field from transition poles, which act as the applied field $H_A$, can interact with the element at the above preferred angles of 135° and 315° to the easy axis Y.

FIG. 8A illustrates the field resulting from a section through the tape with MR elements P and R lying immediately above a transition of a permanent magnetic recording after the left hand side has been subjected to a $\theta = -45°$ development field and the right hand side has been developed axially, at $\theta = 0°$, as shown in FIG. 6. The field lines interact with the MR elements P and R to produce shifts in orientation of magnetic vector M. The MR elements are represented by the horizontal lines, P and R, which are also shown in magnified form to display the effects of the applied field $H_A$. Clearly the transition field is sensed strongly by the element P as is illustrated by the left hand continuous line graph shown in FIG. 9.

FIG. 8B illustrates the field resulting from a section in the region of a permanent magnetic recording between transitions after being subjected to developing fields as defined above. The heads here lie above 'A' type regions of FIG. 6. The fluctuations in magnetic field resulting from the edge poles interacts with the MR elements P and R to produce shifts in orientation of magnetic vector m. The elements are illustrated as with FIG. 8A. In this instance, the edge pole field is sensed strongly by the element R as illustrated in FIG. 9 by the right hand broken line graph.

Therefore by approximately locating MR elements P and R as shown in FIG. 6, and biasing as shown in FIG. 7, sensitivity to one or other of the transition or edge pole fields may be improved, element P in the above example being more sensitive to a transition field and element R being more sensitive to an edge field. The extra MR element Q may optionally be utilized to compensate for speed variation of the medium as described, for example in the paper by G. E. Moore and L. J. Cote in IEEE Transactions on Magnetics, vol. MAG. 12, No. 6, p. 719, 1976. The element R would normally be utilized to check for the presence of edge poles while the element P senses the permanently recorded information represented by the transitions.

Edge pole patterns are unique to a genuine watermarked recording medium, and P and R element signals may be compared in a method of verifying the genuineness of the permanent recording.

Such verification may consist of oscillographic comparison of transition and edge pole signals as defined in FIG. 9; alternative methods of comparison will be evident to those skilled in the art.

It is not essential for the edge pole developing fields to be axial, and it will be understood that the embodiment illustrated shows an applicaton of the invention in one form only for the purpose of illustration. In practice the invention may be applied to many different configurations, the detailed embodiments being straightforward for those skilled in the art to implement.

It is possible to sense edge poles from regions other than the physical edge of a watermark recording medium. For example, a watermarked medium may first be AC erased, i.e. fully demagnetised, and a DC development field then applied to create a developed track in the medium. Edge poles will occur at the boundaries of the developed track which may be sensed and used for verification as hereinbefore described.

Alternatively, a track may first be DC developed, with the developing field in a first direction, and an adjacent region may be developed in a second direction. Edge poles will occur at boundaries between tracks having different orientations. Such development may be conventionally carried out by means of one or more recording heads.

I claim:

1. A method of reading information which is permanently recorded on a magnetic layer containing magnetically anisotropic particles, selected first regions of said layer containing particles whose easy axes are predominantly oriented in a selected first orientation direction, said first regions being spaced from one another regions containing particles whose easy axes are predominantly orientated in a selected second orientation direction, said permanently recorded information being represented by the positions of transitions which define the boundaries between adjacent first and second regions, said transitions lying substantially parallel to one another, said information being prepared for read-out by the application and subsequent removal of a saturating uni-directional developing field, neither of said first and second orientation directions being parallel to said transitions, and said developing field being in a direction lying between said first and second orientation directions and not at right angles to the transitions such that the components of remanant magnetisation at right angles to the transitions in adjacent first and second regions are in opposite directions, field sensing means being used to detect the positions of said transitions.

2. A method according to claim 1 in which said medium is of elongate strip-like form having an axis defined as parallel to a long edge of said medium, said first selected direction lying at substantially 22.5° to said axis, said second selected direction lying substantially 67.5° to said axis in the same rotational sense, and said developing field being directed at substantially 45° to said axis in the opposite rotational sense.

3. A method according to claim 1 in which said field sensing means comprises a magnetoresistive transducer to which horizontal and vertical bias fields are applied such that said transducer is least sensitive to magnetic fields directed at substantially 45° or 225° to the easy axis of said transducer and is most sensitive to magnetic fields directed at substantially 135° or 315° to said easy axis in the said rotational sense.

4. A method of verifying a recording medium purporting to represent a magnetically structured medium, said medium being prepared for verification by the application and subsequent removal of uni-directional developing field to form a developed track in said medium, in which field sensing means are used to detect the fluctuations in remanent magnetic pole strength along an edge of said track, thereby establishing whether said medium is genuine.

5. A method according to claim 4 in which said edge is formed by a physical edge of said medium.

6. A method according to claim 4 in which said edge defines a boundary of said developed track which lies adjacent to a demagnetised region of said medium.

7. A method according to claim 4 in which said edge defines a boundary of said developed track which lies adjacent to a region of said medium which has been magnetised in a direction other than the direction of said uni-directional developing field.

8. A method according to claim 4, in which said medium is of elongate strip-like form in which said developing field is applied in a direction substantially parallel to a long edge of said medium.

9. A method according to claim 4 in which said field sensing means comprises a magnetoresistive transducer to which horizontal and vertical bias fields are applied such that said transducer is least sensitive to magnetic fields directed at substantially 45° or 225° to the easy axis of said transducer and is most sensitive to magnetic fields directed at substantially 135° or 315° to said easy axis in the same rotational sense.

* * * * *